(12) United States Patent
Yamaguchi

(10) Patent No.: US 6,813,253 B1
(45) Date of Patent: Nov. 2, 2004

(54) BASE STATION APPARATUS

(75) Inventor: Kazuhiko Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/498,857

(22) Filed: Feb. 7, 2000

(30) Foreign Application Priority Data

Mar. 15, 1999 (JP) .......................................... 11-0688835

(51) Int. Cl.[7] .............................................. H04Q 7/30

(52) U.S. Cl. ........................ 370/330; 370/336; 370/347

(58) Field of Search ................................ 370/328, 329, 370/330, 336, 343, 345, 347, 537, 540, 478; 455/561

(56) References Cited

U.S. PATENT DOCUMENTS

| | | | | |
|---|---|---|---|---|
| 5,790,959 A | * | 8/1998 | Scherer ........................ | 455/561 |
| 6,236,866 B1 | * | 5/2001 | Meyer et al. ................. | 455/562 |
| 6,317,423 B1 | * | 11/2001 | Jantti et al. ................... | 370/347 |
| 6,385,188 B1 | * | 5/2002 | Kim et al. ..................... | 370/342 |
| 6,483,823 B1 | * | 11/2002 | Mansour ....................... | 370/330 |

FOREIGN PATENT DOCUMENTS

| | | |
|---|---|---|
| JP | 62-104232 | 5/1987 |
| JP | 63-272137 | 11/1988 |

* cited by examiner

*Primary Examiner*—Min Jung
(74) *Attorney, Agent, or Firm*—Katten Muchin Zavis Rosenman

(57) ABSTRACT

A base station apparatus is used for a radio communication system which divides one cell into a plurality of sectors and communicates with a plurality of terminal stations according to TDMA via antennas which are provided for each of the sectors. The base station apparatus includes a frequency-based distributor and modulator unit which distributes each of channel data to be transmitted in correspondence with each of time slots of a plurality of transmission frequency-based channels, and modulates the distributed channel data to modulated signals, a sector-based distributor and multiplexer unit which distributes the modulated signals to sector-based channels which are prescribed in advance in correspondence with the time slots, and multiplexes the distributed modulated signals for each of the sector-based channels, and a channel connection controller which generates distribution control information of each of the transmission frequency-based channels and the sector-based channels depending on a channel connect or disconnect request.

7 Claims, 21 Drawing Sheets

FIG. 2
PRIOR ART

|  | T1 | T2 | T3 | T4 | T1 | T2 | T3 | T4 |
|---|---|---|---|---|---|---|---|---|
| SECTOR1 f1 | A |  |  | CT | A |  |  | CT |
| SECTOR2 f2 | B | C |  | CT | B | C |  | CT |
| SECTOR3 f3 | D | E | F | CT | D | E | F | CT |

FIG. 9

| ITEM NUMBER | TERMINAL | SECTOR | FREQUENCY | SLOT |
|---|---|---|---|---|
| 1 | Ⓐ | 1 | f1 | S1 |
| 2 | Ⓑ | 2 | f2 | S1 |
| 3 | C | 2 | f2 | S2 |
| 4 | D | 3 | f3 | S1 |
| 5 | E | 3 | f3 | S2 |
| 6 | F | 3 | f3 | S3 |
| 7 | G | 3 | f1 | S3 |
| 8 | | | | |
| 9 | | | | |

FIG. 10A 22 (CM1)

| f \ T | T1 | T2 | T3 |
|---|---|---|---|
| f1 | Ⓐ | | G |
| f2 | Ⓑ | C | |
| f3 | D | E | F |

FIG. 10B 23 (CM3)

| f' \ R | R1 | R2 | R3 |
|---|---|---|---|
| f1' | Ⓐ | | G |
| f2' | Ⓑ | C | |
| f3' | D | E | F |

F I G. 1 1

24(CM2)

| S \ T | T1 | T2 | T3 | T4 |
|---|---|---|---|---|
| S11 | 1 | 0 | 0 | 1 |
| S12 | 0 | 0 | 0 | 0 |
| S13 | 0 | 0 | 1 | 0 |
| S21 | 0 | 0 | 0 | 0 |
| S22 | 1 | 1 | 0 | 1 |
| S23 | 0 | 0 | 0 | 0 |
| S31 | 0 | 0 | 0 | 0 |
| S32 | 0 | 0 | 0 | 0 |
| S33 | 1 | 1 | 1 | 1 |

FIG. 16

| ITEM NUMBER | TERMINAL | SECTOR | FREQUENCY | SLOT |
|---|---|---|---|---|
| 1 | Ⓐ | 1 | f2 | S3 |
| 2 | Ⓑ | 2 | f2 | S1 |
| 3 | C | 2 | f2 | S2 |
| 4 | D | 3 | f3 | S1 |
| 5 | E | 3 | f3 | S2 |
| 6 | F | 3 | f3 | S3 |
| 7 | G | 3 | × | × |
| 8 | | | | |
| 9 | | | | |

FIG. 17A

| f \ T | T1 | T2 | T3 |
|---|---|---|---|
| f1 | × | × | × |
| f2 | Ⓑ | C | Ⓐ |
| f3 | D | E | F |

FIG. 17B

| f' \ R | R1 | R2 | R3 |
|---|---|---|---|
| f1' | — | — | — |
| f2' | Ⓑ | C | Ⓐ |
| f3' | D | E | F |

FIG. 18

| 24(CM2) S\T | T1 | T2 | T3 | T4 |
|---|---|---|---|---|
| S11 | 0 | 0 | 0 | 0 |
| S12 | 0 | 0 | 0 | 0 |
| S13 | 0 | 0 | 0 | 0 |
| S21 | 0 | 0 | 1 | 1 |
| S22 | 1 | 1 | 0 | 1 |
| S23 | 0 | 0 | 0 | 0 |
| S31 | 0 | 0 | 0 | 0 |
| S32 | 0 | 0 | 0 | 0 |
| S33 | 1 | 1 | 1 | 1 |

FIG. 19A

| 25 f\T | MOD | TFCV | HPA |
|---|---|---|---|
| f1 | 0 | 1 | 0 |
| f2 | 0 | 0 | 0 |
| f3 | 0 | 0 | 0 |

FIG. 19B

| 26 f'\R | DEM | RFCV | LNA |
|---|---|---|---|
| f1' | 0 | 0 | 0 |
| f2' | 0 | 0 | 0 |
| f3' | 0 | 0 | 0 |

FIG. 23

| ITEM NUMBER | TERMINAL | SECTOR | FREQUENCY | SLOT |
|---|---|---|---|---|
| 1 | Ⓐ | 1 | f1 | S1 |
| 2 | Ⓑ | 2 | f1 | S2 |
| 3 | C | 2 | f1 | S3 |
| 4 | | | | |
| 5 | | | | |
| 6 | | | | |
| 7 | | | | |
| 8 | | | | |
| 9 | | | | |

| f \ T | T1 | T2 | T3 |
|---|---|---|---|
| f1 | A | B | C |
| f2 | | | |
| f3 | | | |

FIG. 24B 23 (CM3)

| f' \ R | R1 | R2 | R3 |
|---|---|---|---|
| f1' | A | B | C |
| f2' | | | |
| f3' | | | |

FIG. 25

| 24(CM2) T<br>S | T1 | T2 | T3 | T4 |
|---|---|---|---|---|
| S11 | 1 | 0 | 0 | 1 |
| S12 | 0 | 1 | 1 | 1 |
| S13 | 0 | 0 | 0 | 0 |
| S21 | 0 | 0 | 0 | 0 |
| S22 | 0 | 0 | 0 | 0 |
| S23 | 0 | 0 | 0 | 0 |
| S31 | 0 | 0 | 0 | 0 |
| S32 | 0 | 0 | 0 | 0 |
| S33 | 0 | 0 | 0 | 0 |

FIG. 26A

| 27 T<br>f | MOD | TFCV | HPA |
|---|---|---|---|
| f1 | 1 | 1 | 1 |
| f2 | 0 | 0 | 0 |
| f3 | 0 | 0 | 0 |

FIG. 26B

| 28 R<br>f' | DEM | RFCV | LNA |
|---|---|---|---|
| f1' | 1 | 1 | 1 |
| f2' | 0 | 0 | 1 |
| f3' | 0 | 0 | 0 |

BASE STATION APPARATUS

BACKGROUND OF THE INVENTION

1. Field of the Invention

The present invention generally relates to base station apparatuses, and more particularly to a base station apparatus in a radio communication system, which divides 1 cell into a plurality of sectors and communicates with a plurality of terminal stations according to Time Division Multiple Access (TDMA) via antennas provided for each of the sectors.

Recently, due to increasing number of terminal subscribers in mobile communication systems, there are demands to increase the number of terminal stations that can be accommodated by the base station. In order to efficiently increase the number of terminal stations that can be accommodated by the base station, it is necessary to not only effectively utilize the frequencies, but to also reduce the size and power consumption of the base station facility.

2. Description of the Related Art

FIG. 1 is a diagram showing the construction of a part of a conventional TDMA mobile communication system. The mobile communication system shown in FIG. 1 includes a mobile switching station 60 which connects to a public network and accommodates a plurality of base station apparatuses BS, a conventional base station apparatus 50 which is one of such base station apparatuses BS, directional antennas a1 through a3 which respectively cover communication areas of sectors 1 through 3, a cell (service area) 100 which is formed by the sectors 1 through 3, and mobile terminals A through G.

The conventional base station apparatus 50 fixedly allocates frequencies f1 through f3 to the sectors 1 through 3, respectively. In other words, the terminal A in the sector 1 uses the frequency f1, the terminals B and C in the sector 2 use the frequency f2, and the terminals D through F in the sector 3 use the frequency f3, in order to connect to the base station apparatus 50.

FIG. 2 is a timing chart for explaining a down-communication from the base station apparatus 50 to each of the terminals A through G. It is assumed that transmission slots T1 through T3 are used as speech channels for transmitting speech data, and a transmission slot T4 is used as a control channel for transmitting information related to a connection state of a terminal, connect request and the like. In this example, the terminal A in the sector 1 is accommodated in the time slot T1 of the frequency f1, the terminals B and C in the sector 2 are respectively accommodated in the time slots T1 and T2 of the frequency f2, and the terminals D through F in the sector 3 are respectively accommodated in the time slots T1 through T3 of the frequency f3. Hence, in 1 cell of the base station apparatus 50, a maximum of 3 terminals can be accommodated in each of the sectors 1 through 3 at the respective frequencies f1 through f3, and a total of 9 terminals can be accommodated simultaneously in 1 cell.

However, if an attempt is made in the above case to additionally accommodate a fourth terminal G in the sector 3, it is impossible to accommodate this terminal G in the sector 3 because there is no vacant time slot of the frequency f3 in the conventional base station apparatus 50.

In addition, if the terminal G is forcibly accommodated in the sector 3, it becomes necessary to increase the frequency used per sector. As a result, it is impossible to efficiently utilize the frequency, and there are problems in that the circuit scale, the power consumption and the cost of the base station apparatus all increase.

SUMMARY OF THE INVENTION

Accordingly, it is a general object of the present invention to provide a novel and useful base station apparatus in which the problems described above are eliminated.

Another and more specific object of the present invention is to provide a base station apparatus which can flexibly and efficiently accommodate a large number of terminals per sector.

Still another object of the present invention is to provide a base station apparatus is used for a radio communication system which divides one cell into a plurality of sectors and communicates with a plurality of terminal stations according to TDMA via antennas which are provided for each of the sectors. The base station apparatus includes a frequency-based distributor and modulator unit which distributes each of channel data to be transmitted in correspondence with each of time slots of a plurality of transmission frequency-based channels, and modulates the distributed channel data to modulated signals, a sector-based distributor and multiplexer unit which distributes the modulated signals to sector-based channels which are prescribed in advance in correspondence with the time slots, and multiplexes the distributed modulated signals for each of the sector-based channels, and a channel connection controller which generates distribution control information of each of the transmission frequency-based channels and the sector-based channels depending on a channel connect or disconnect request. According to the base station apparatus of the present invention, it is possible to flexibly and efficiently accommodate a large number of terminals for each sector, by use of a relatively simple construction. For this reason, it is possible, in a TDMA communication system, to effectively utilize the frequencies, enlarge the number of subscribers that can be accommodated, thereby improving the communication service and the service reliability.

Other objects and further features of the present invention will be apparent from the following detailed description when read in conjunction with the accompanying drawings.

BRIEF DESCRIPTION OF THE DRAWINGS

FIG. 2 is a timing chart for explaining a down-communication from a base station apparatus to each of the terminals;

FIG. 9 is a diagram for explaining a terminal management table of the first embodiment;

FIGS. 10A and 10B respectively are diagrams for explaining a transmission frequency and slot management table and a reception frequency and slot management table of the first embodiment;

FIG. 11 is a diagram for explaining a sector allocation control table of the first embodiment;

FIG. 16 is a diagram for explaining a terminal management table of the second embodiment;

FIGS. 17A and 17B respectively are diagrams for explaining a transmission frequency and slot management table and a reception frequency and slot management table of the second embodiment;

FIG. 18 is a diagram showing a sector allocation control table of the second embodiment;

FIGS. 19A and 19B respectively are diagrams for explaining a transmission failed equipment management table and a reception failed equipment management table of the second embodiment;

FIG. 23 is a diagram for explaining a terminal management table of the third embodiment;

FIGS. 24A and 24B respectively are diagrams for explaining a transmission frequency and slot management table and a reception frequency and slot management table of the third embodiment;

FIG. 25 is a diagram for explaining a sector allocation control table of the third embodiment; and FIGS. 26A and 26B respectively are diagrams for explaining a transmission power supply management table and a reception power supply management table of the third embodiment.

DESCRIPTION OF THE PREFERRED EMBODIMENTS

Figure 3:
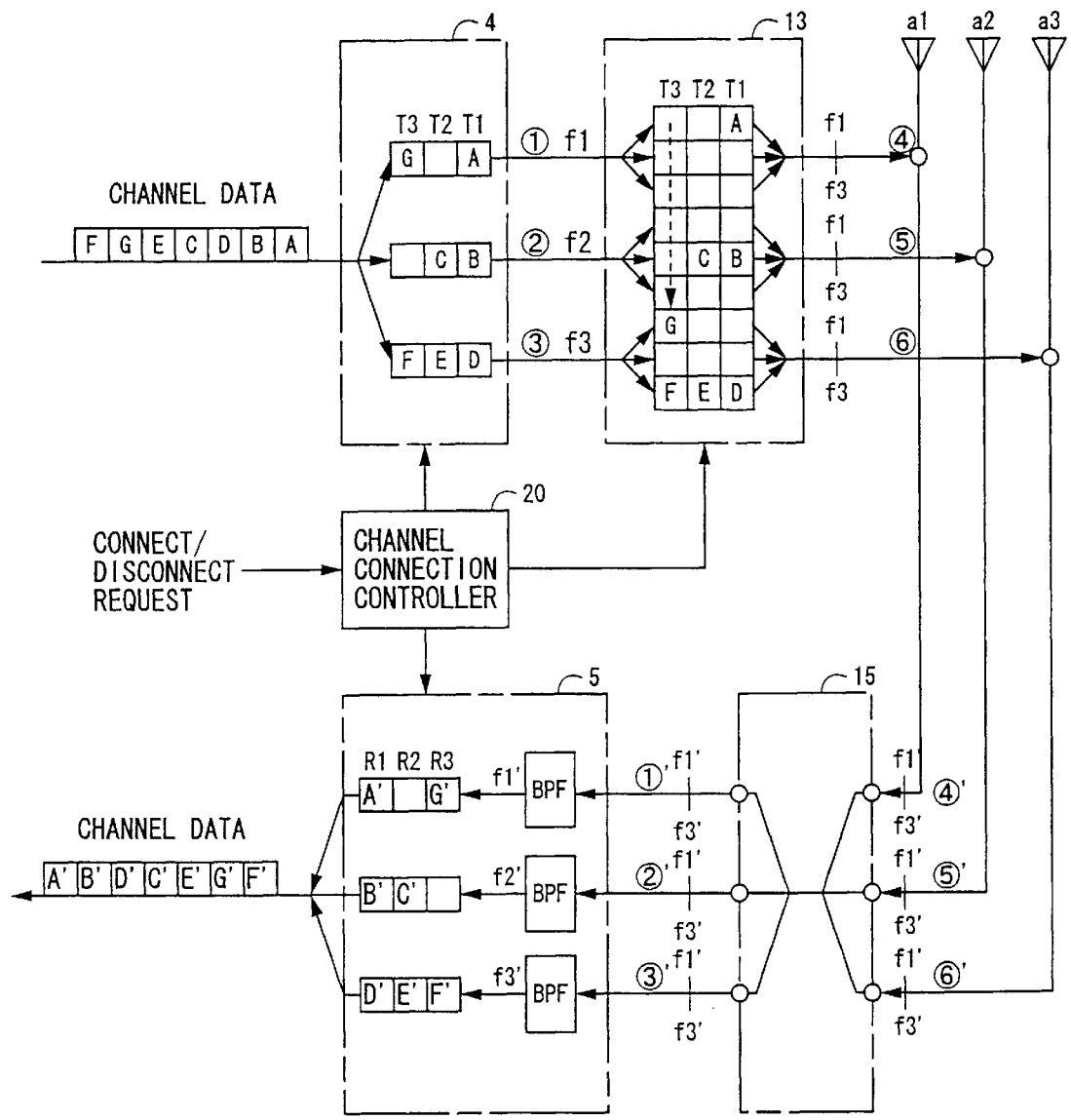
FIG. 3 is a diagram for explaining the operating principle of the present invention.

First, a description will be given of the operating principle of the present invention, by referring to FIG. 3. FIG. 3 is a diagram for explaining the operating principle of the present invention.

A base station apparatus according to the present invention is used in a radio communication system, and divides 1 cell into a plurality of sectors and communicates with a plurality of terminal stations according to TDMA via antennas provided for each of the sectors. For example, 1 cell is divided into sectors 1 through 3, and antennas a1 through a3 are respectively provided for the sectors 1 through 3. The base station apparatus includes a frequency-based distributor and modulator 4, a sector-based distributor and multiplexer 13, and a channel connection controller 20.

The frequency-based distributor and modulator 4 distributes each channel data to be transmitted to corresponding time slots of a plurality of transmission frequency channels ① through ③, and modulates the distributed channel data. The sector-based distributor and multiplexer 13 distributes each of modulated signals f1 through f3 to sector channels ④ through ⑥ which are prescribed in advance in correspondence with time slots T1 through T3, and multiplexes or combines the distributed modulated signals for each channel. The channel connection controller 20 generates distribution control information of the transmission frequency-based channel and sector-based channel depending on a channel connect/disconnect request.

The present invention employs a simple construction which enables connection by separating the sectors with the transmission frequencies and the time slots, so that a terminal within one sector can be accommodated at any transmission frequency and time slot. When applied to the case shown in FIG. 1 described above, for example, it is basically possible to accommodate the terminals D through F existing in the sector 3 in the time slots T1 through T3 of the transmission frequency f3, similarly to the conventional case, and to simultaneously accommodate the fourth terminal G existing in the sector 3 by using the time slot T3 of the transmission frequency f1, without introducing interference among the terminals D through G. Therefore, according to the present invention, it is possible to flexibly cope with a temporary increase of the number of terminals existing in one sector. In an extreme case, it is possible to allocate all vacant time slots to one section in which the users, that is, the terminals are concentrated. As a result, the present invention can effectively utilize the existing frequency resources to a maximum, without increasing the circuit scale or the power consumption of the base station apparatus.

According to another aspect of the present invention, the base station apparatus is provided with a sector multiplexer and distributor unit 15, and a frequency-based demodulator 5. The sector multiplexer and distributor unit 15 multiplexes or combines received signals f1' through f3' of sector-based channels ④' through ⑥', and distributes the combined received signals to a plurality of received frequency-based channels ①' through ③'. The frequency-based demodulator 5 extracts frequency signals f1' through f3' respectively corresponding to the received frequency-based channels ①' through ③', from each of distributed signals f1' through f3'. In this case, it is possible to bi-directionally accommodate the terminals within one sector in pairs of the desired transmission/reception frequency and transmission/reception time slot.

According to still another aspect of the present invention, the channel connection controller 20, in response to a new channel connect request, generates each distribution control information so that the vacant time slots of the transmission frequency-based channels ① through ③ are connected to the sector in which the terminal making the connect request exists.

Figure 1:
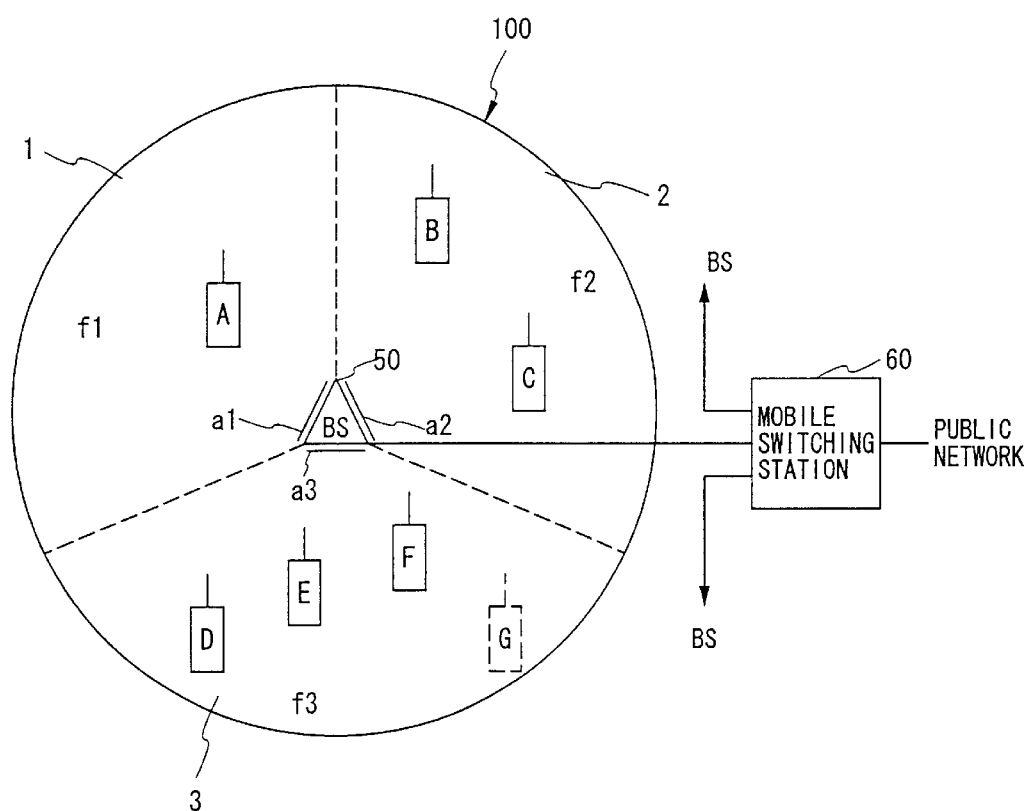
FIG. 1 is a diagram showing the construction of a part of a conventional TDMA mobile communication system.

When applied to the case shown in FIG. 1 described above, the time slots T1 through T3 of the transmission frequency channel ③ (sector 3) are already used by the terminals D through F as shown in FIG. 3. However, according to this aspect of the present invention, in response to the new channel connect request related to the terminal G existing in the sector 3, the channel connection controller 20 generates each distribution control information so as to distribute an input channel data G to the vacant time slot T3 of the transmission frequency-based channel ①, and to distribute a modulated signal G of the transmission frequency f1 to the sector 3 at the timing of the time slot T3. Accordingly, it is possible to effectively utilize the frequency, and to flexibly cope with a situation where the number of terminals existing in the sector 3 temporarily increases.

According to a further aspect of the present invention, a failure information collector (not shown) is provided to collect failure information of each equipment within the base station apparatus. Based on the failure information collected by the failure information collector, the channel connection controller 20 uses a time slot which is unaffected by the failed equipment out of the time slots of the transmission frequency-based channel.

Hence, in this case, when the equipments within the base station apparatus fail, the channel and the frequency are reconnected or newly connected so as not to be affected by the failed equipment, without the need to employ an expensive redundant configuration. For this reason, it is possible to appropriately continue and start the communication, thereby effectively utilizing the existing communication facilities.

In addition, according to another aspect of the present invention, a power supply controller (not shown) is provided to control ON/OFF state of the power supply with respect to each equipment within the base station apparatus in response to an instruction from the channel connection controller 20. The channel connection controller 20 outputs an instruction for turning OFF the power supply to each equipment which is within the base station apparatus and in which the transmission or reception frequency-based channel is not used. As a result, the power consumption of the base station apparatus is reduced.

For example, the terminal A in the sector 1 is accommodated in the time slot (T1, R1) of the frequency (f1, f1'), and the terminals B and C in the sector 2 are respectively accommodated in the time slots (T2, R2) and (R3, R3) of the frequency (f1, f1'). If no other terminal exists in the cell, the equipments of the transmission/reception frequency-based channels ②, ③, ②' and ③' are not used. Hence, the power supply to these equipments which are not used is turned OFF, so that the power consumption of the base station apparatus is greatly reduced.

According to still another aspect of the present invention, the channel connection controller 20 uses the time slots so that the time slots are fully utilized in a sequence starting from one of the transmission frequency-based channels.

Figure 4:
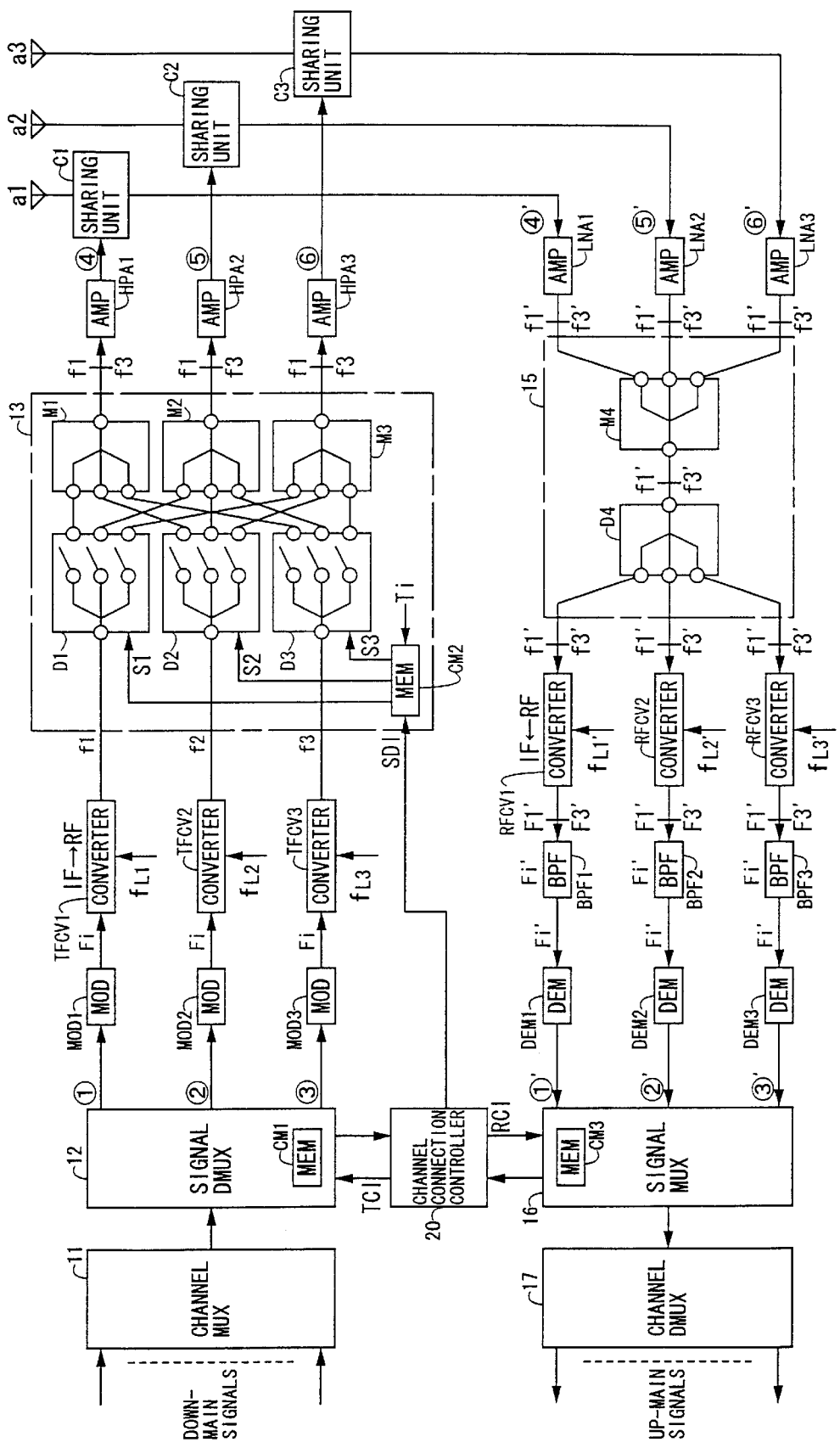
FIG. 4 is a system block diagram showing a first embodiment of a base station apparatus according to the present invention.

Next, a description will be given of embodiments of the base station apparatus according to the present invention, by referring to FIG. 4 and the subsequent figures. In FIGS. 4 and the subsequent figures, the same parts are designated by the same reference numerals.

FIG. 4 is a system block diagram showing a first embodiment of the base station apparatus. FIG. 4 shows the construction for a case where 1 cell is formed by 3 sectors.

In FIG. 4, a channel multiplexer 11 multiplexes channel data of down-main signals which are supplied from a switching station to a base station. A frequency-based signal demultiplexer 12 distributes the multiplexed channel data to time slots of a plurality of transmission frequency-based channels ① through ③. The frequency-based signal demultiplexer 12 includes a control memory CM1 which stores distribution control information. Modulators MOD1 through MOD3 carry out modulations according to a (π/2) shift QPSK or the like. Frequency converters TFCV1 through TFCV3 convert an intermediate frequency signal IF (=Fi) to a radio frequency signal RF (=f1, f2, f3). A sector distributor and multiplexer unit 13 distributes the radio frequency signals f1 through f3 to sector-based channels ④ through ⑥ which are prescribed in advance in correspondence with the time slots, and multiplexes or combines the distributed radio frequency signals f1 through f3 for each of the channels. The sector distributor and multiplexer unit 13 includes distributors D1 through D3 which are provided with switches, multiplexers M1 through M3, and a control memory CM2 which stores distribution control information which is prescribed in correspondence with the time slots. High-output power amplifiers HPA1 through HPA3, antenna sharing units C1 through C3, and directional antennas a1 through a3 which are respectively provided in correspondence with the sectors 1 through 3, are arranged on the output side of the sector distributor and multiplexer unit 13.

Low-noise amplifiers LNA1 through LNA3 respectively amplify received frequency signals f1' through f3' which are received from the antennas a1 through a3 of corresponding sector-based channels ④' through ⑥'. A sector multiplexer and distributor unit 15 multiplexes or combines the received frequency signals of the sector-based channels ④' through ⑥', and distributes the combined received frequency signals to a plurality of reception frequency-based channels ①' through ③'. The sector multiplexer and distributor unit 15 includes a multiplexer M4 and an distributor D4. Frequency converters RFCV1 through RFCV3 respectively convert the radio frequency signals f1' through f3' into intermediate frequency signals F1' through F3'. Bandpass filters BPF1 through BPF3 have a center frequency F0=Fi' (or=Fi). Demodulators DEM1 through DEM3 carry out demodulations according to the (π/2) shift QPSK or the like. A signal multiplexer 16 multiplexes the demodulated data in corresponding time slots. The signal multiplexer 16 includes a control memory CM3. A channel demultiplexer 17 demultiplexes and distributes the multiplexed data to channels of up-main signals which are supplied from the base station to the switching station. A channel connection controller 20 generates distribution control information of the transmission frequency-based channels and the sector-based channels, in response to channel connect/disconnect requests.

The channel connect/disconnect requests include requests which use a pre-assign system which determines connection schedules of subscribers (terminals) in advance, and requests which use a demand-assign system which connects a line in response to a request from a subscriber (networks or terminals) in real-time. In the case of the pre-assign system, a call management unit (not shown) which is provided in the switching station 60 or is connected to the base station apparatus 10 inputs a channel connect/disconnect request to the channel connection controller 20 depending on a predetermined schedule. On the other hand, in the case of the demand-assign system, a channel connect request from the network is supplied to the channel connection controller 20 via a main signal line, when a terminal within the cell is called. In addition, when a terminal within the cell calls, a channel connect request from the network which accepts this call or from the terminal is supplied to the channel connection controller 20 via the main signal line or a demodulation line. Hence, according to this first embodiment, the base station apparatus 10 can accommodate a mixture of terminals which use the pre-assign system and the terminals which use the demand-assign system.

In the following description, it is assumed for the sake of convenience that terminals A and B use the pre-assign system, and that terminals C through G use the demand-assign system. The terminals A and B are easily distinguished from the other terminals C through G in the drawings by circular marks which surround the terminal designations A and B.

The channel multiplexer 11 multiplexes the channel data of the down-main signals, and the frequency-based signal demultiplexer 12 distributes the multiplexed channel data to the time slots of the transmission frequency-based channels ① through ③ depending on the stored contents of the control memory CM1. In other words, the structure made up of the channel multiplexer 11 and the frequency-based signal demultiplexer 12 functions as a speech channel switch which connects the channel data of the input line to each of the transmission time slots (a maximum of 9 slots) of the radio line, depending on the stored contents of the control memory CM1. If the channel data are already multiplexed on the input line, the channel multiplexer 11 can be omitted.

FIG. 10A shows the stored contents of the control memory CM1, that is, a transmission frequency and slot management table. The stored contents of the control memory CM1 shown in FIG. 10A indicate that speech data A and G respectively addressed to the terminals A and G are connected to corresponding time slots T1 and T3 of the transmission frequency f1, speech data B and C respectively addressed to the terminals B and C are connected to corresponding time slots T1 and T2 of the transmission frequency f2, and speech data D through F respectively addressed to the terminals D through F are connected to corresponding time slots T1 through T3 of the transmission frequency f3.

Returning now to the description of FIG. 4, the modulators MOD1 through MOD3 modulate a carrier signal having a constant intermediate frequency Fi by the corresponding channel data of the frequency-based channels ① through ③, and generate the intermediate frequency signal Fi. The frequency converters TFCV1 through TFCV3 convert the input intermediate frequency signal Fi into the corresponding output radio frequency signals f1 through f3 based on respective local frequency signals $f_{L1}$ through $f_{L3}$, where the following relationships stand.

$$f1 < f2 < f3$$

$$f_{L1} = f1 - Fi$$

$$f_{L2} = f2 - Fi$$

$$f_{L3} = f3 - Fi$$

In the sector distributor and multiplexer unit 13, the distributors D1 through D3 divide the corresponding transmission frequency signals f1 through f3 of the transmission frequency-based channels ① through ③, and distribute each of the divided signals to the corresponding sector-based channels ④' through ⑥' which are prescribed in advance in correspondence with the time slots depending on group switch control signals S1 through S3 which are obtained from the control memory CM2. The multiplexers M1 through M3 multiplex the distributed transmission frequency signals f1 through f3 for each of the corresponding sector-based channels ④' through ⑥'.

Figure 5:
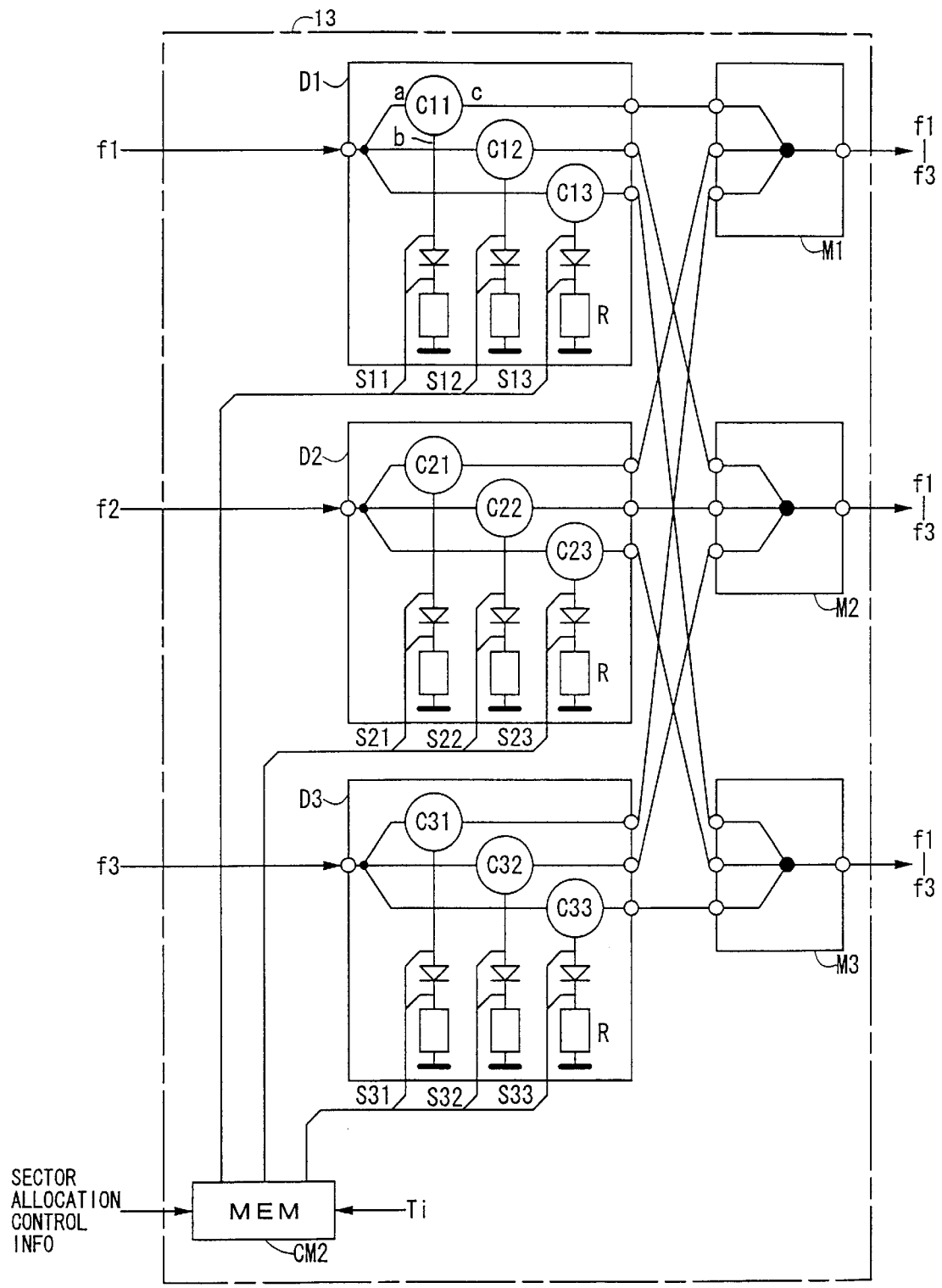
FIG. 5 is a diagram showing an embodiment of a sector distributor and multiplexer unit.

FIG. 5 is a diagram showing an embodiment of the sector distributor and multiplexer unit 13 applied to a microwave circuit. In FIG. 5, the power of the transmission frequency signal f1 is divided into 3 by the distributor D1, and each divided power is input to a terminal a of a corresponding one of circulators C11 through C13. In the case of the circulator C11, for example, a terminal b is non-reflectively terminated by a resistor R via a PIN diode. Accordingly, when a switching signal S11 is forward biased and S11=1, the PIN diode is turned ON, and the signal at the terminal a is terminated at the terminal b and does not finally appear at a terminal c. On the other hand, when the switching signal S11 is reverse biased and S11=0, the PIN diode is turned OFF, and the signal at the terminal a is reflected at the terminal b and finally appears at the terminal c. The circulators C12 and C13 operates similarly to the circulator C11 described above. Of course, such a microwave switching circuit may be provided on the side of the multiplexers M1 through M3 instead of being provided at the side of the distributors D1 through D3.

FIG. 11 shows the stored contents of the control memory CM2, that is, a sector distribution control table. The stored contents of the control memory CM2 are generated based on the stored contents of a transmission frequency and slot management table 22 shown in FIG. 8A, and are transferred to the control memory CM2. When attention is drawn to the group of the switching signal S1 in FIG. 11, the transmission frequency signal f1 addressed to the terminal A is output to the side of the multiplexer M1 at the time slot T1 responsive to the switching signal S11=1. At the time slot T2, no transmission frequency signal f1 is output from the distributor D1, since the switching signals S11, S12 and S13 are S11=S12=S13=0. At the time slot T3, the transmission frequency signal f1 addressed to the terminal G is output to the side of the multiplexer M3 responsive to the switching signal S13=1. At the time slot T4, the transmission frequency signal f1 for a control channel CT is output to the side of the multiplexer M1, in response to the switching signal S11=1. The sector distributor and multiplexer unit 13 operates similarly for the groups of the switching signals S2 and S3 based on the stored contents of the sector distribution control table of the control memory CM2.

Figure 6:
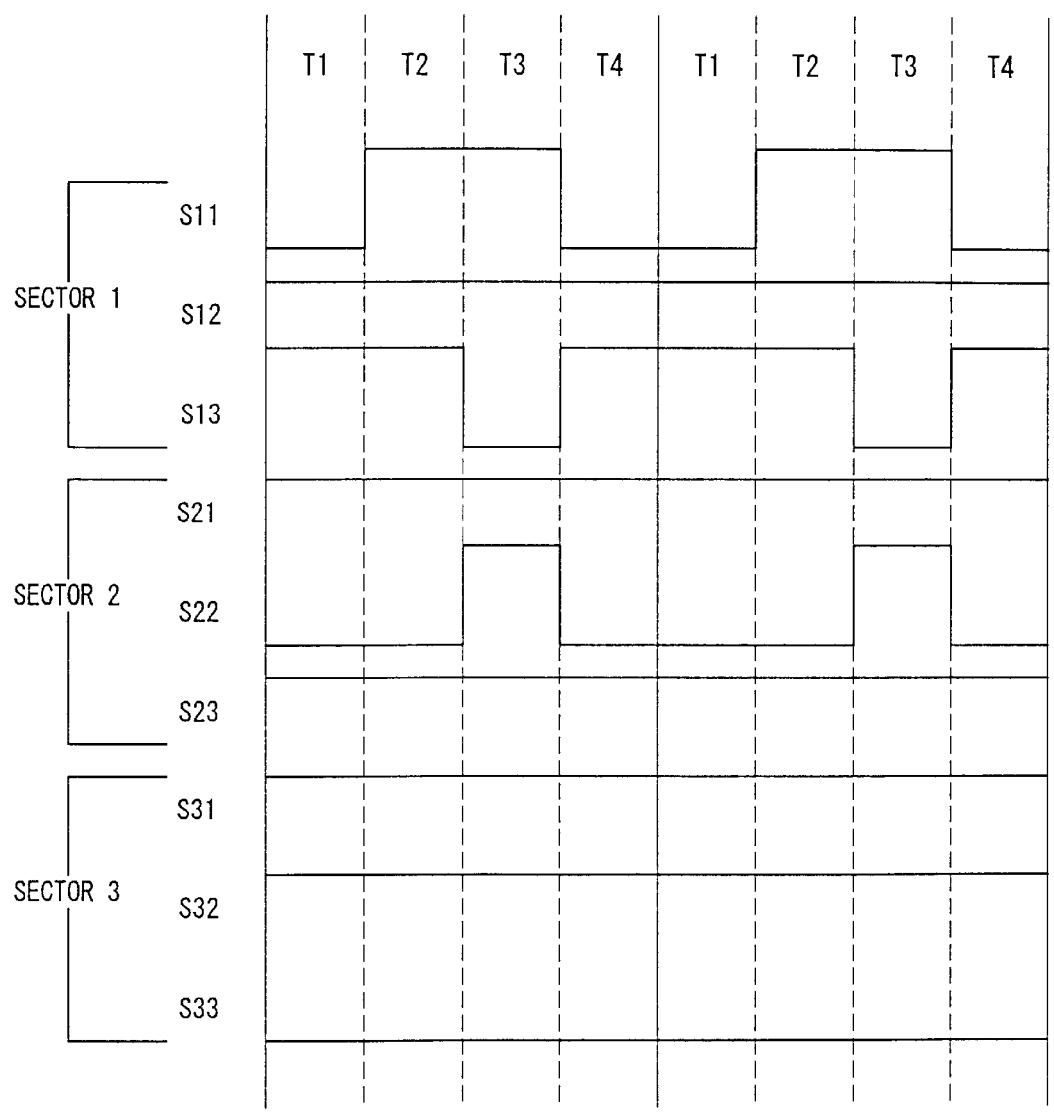
FIG. 6 is a timing chart for explaining the operation of the sector distributor and multiplexer unit.

FIG. 6 is a timing chart for explaining the operation of the sector distributor and multiplexer unit 13. As shown in FIG. 6, the stored contents of the control memory CM2 are read in synchronism with the timings of each of the time slots T1 through T4, to thereby obtain the switching signals S11 through S33. In FIG. 6, it is assumed for the sake of convenience that the switching signal level is low (reverse biased) with respect to the output signal of the control memory CM2 having a level "1", and that the switching signal level is high (forward biased) with respect to the output signal of the control memory CM2 having a level "0".

Returning to the description of FIG. 4, the output signals f1 through f3 of the multiplexers M1 through M3 are amplified by the high-output power amplifiers HPA1 through HPA3, and are emitted to the corresponding sectors 1 through 3 from the antennas a1 through a3 via the antenna sharing units C1 through C3.

On the other hand, the received frequency signals received from the antennas a1 through a3 are input to the corresponding low-noise amplifiers LNA1 through LNA3 via the antenna sharing units C1 through C3, and are amplified to predetermined levels. In the sector multiplexer and distributor unit 15, the received frequency signals f1' through f3' output from the low-noise amplifiers LNA1 through LNA3 are multiplexed in the multiplexer M4, and the power of the multiplexed received signals is divided into 3 by the distributor D4.

Figure 7:
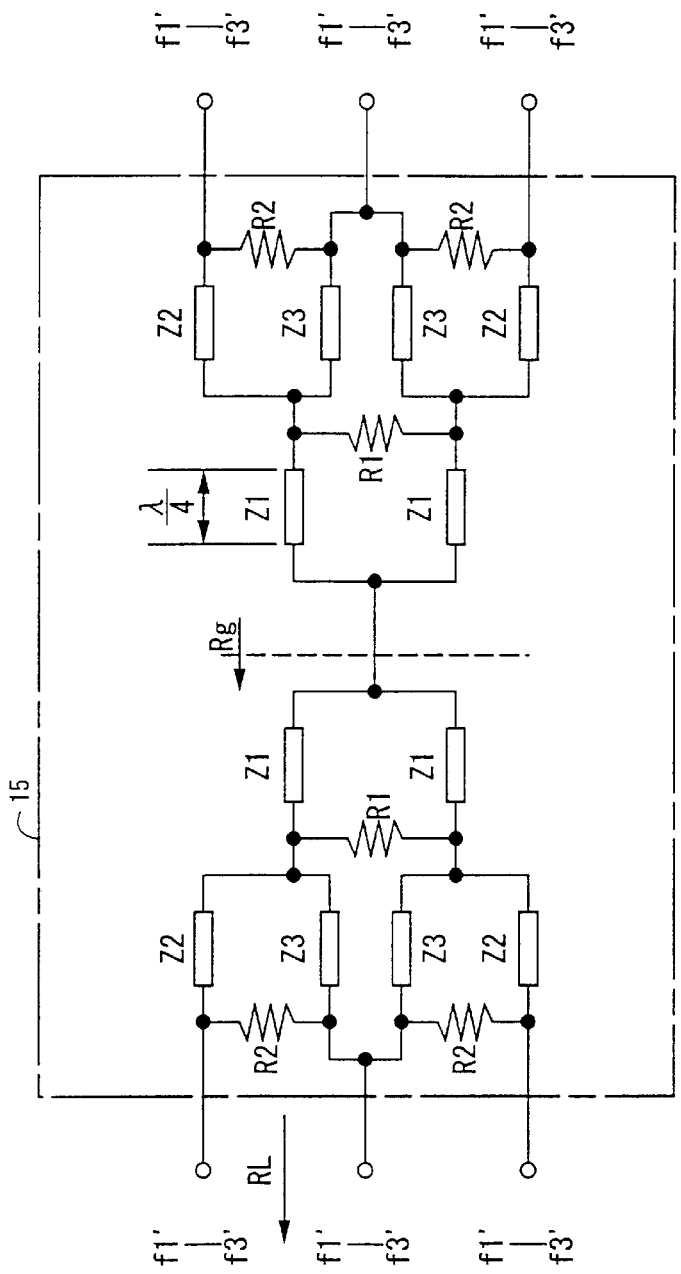
FIG. 7 is a diagram showing an embodiment of the sector multiplexer and distributor unit.

FIG. 7 is a diagram showing an embodiment of the sector multiplexer and distributor unit 15 applied to a microwave circuit. The circuit shown in FIG. 7 may be formed by a known E. J. Wilkinson type 3-power multiplexer and 3-distributor unit. In FIG. 7, each impedance Z is formed by a microstrip line having a length λ/4, where λ denotes the signal wavelength. In addition, each impedance Z is determined under the following conditions, where $R_g$ denotes the input resistance and is 50 Ω, for example, and $R_L$ denotes the output resistance and is 50 Ω, for example.

$$Z1=\sqrt{(2R_g R_L')}$$

$$R1=2 R_L'$$

$$Z2=\sqrt{\{(3/2)R_L R_L'\}}$$

$$Z3=2Z2=\sqrt{(6R_L R_L')}$$

$$R2=3R_L$$

The resistance $R_L'$ can be freely selected, and when broadband conditions for covering the spread of the received frequency signals f1' through f3' are taken into consideration, it is known that it sufficient to satisfy the following conditions.

$$R_L'=\sqrt{\{(4/3)2R_g R_L\}}$$

Returning now to the description of FIG. 4, the output signals f1' through f3' of the sector multiplexer and distributor unit 15 are input to the frequency converters RFCV1 through RFCV3 corresponding to the frequency-based channels ①' through ③', and are converted into the intermediate frequency signals F1' through F3' having the constant frequency Fi', based on the local signals $f_{L1}'$ through $f_{L3}'$. In this case, the following relationships stand.

$$f1'<f2'<f3'$$

$$f_{L1}'=f1'-Fi'$$

$$f_{L2}'=f2'-Fi'$$

$$f_{L3}'=f3'-Fi'$$

Furthermore, the output signals F1' through F3' of the frequency converters RFCV1 through RFCV3 are input to the corresponding bandpass filters BPF1 through BPF3 having the constant center frequency Fi'. Hence, the intermediate frequency signal Fi' corresponding to the received frequency signal f1' is extracted by the bandpass filter BPF1, the intermediate frequency signal Fi' corresponding-to the received frequency signal f2' is extracted by the bandpass filter BPF2, and the intermediate frequency signal Fi' corresponding to the received frequency signal f3' is extracted by the bandpass filter BPF3. The output signals Fi' of the bandpass filters BPF1 through BPF3 are demodulated by the corresponding demodulators DEM1 through DEM3, and input to the signal multiplexer 16.

The signal multiplexer 16 time-division-multiplexes the demodulated data of the frequency-based channels ①' through ③' depending on the stored contents of the control memory CM3. The channel demultiplexer 17 demultiplexes and distributes the multiplexed data from the signal multiplexer 16 to the corresponding channels of the output line. In other words, the structure made up of the signal multiplexer 16 and the channel demultiplexer 17 functions as a speech channel switch which connects the demodulated time slot data (amounting to a maximum of 9 time slots) to each of the reception channels of the wire line depending on the stored contents of the control memory CM3.

FIG. 10B shows the stored contents of the control memory CM3, that is, a reception frequency and slot management table. The stored contents of the control memory CM3 shown in FIG. 10B indicate that speech data A and G respectively originating from the terminals A and G are connected (or switched) to corresponding speech channels A and G of the wire line, speech data B and C respectively originating from the terminals B and C are connected (or switched) to corresponding speech channels B and C of the wire line, and speech data D through F respectively originating from the terminals D through F are connected (or switched) to corresponding speech channels D through F of the wire line. If the up-main signal line is a multiplexed line, the channel demultiplexer 17 can be omitted.

Figure 8:
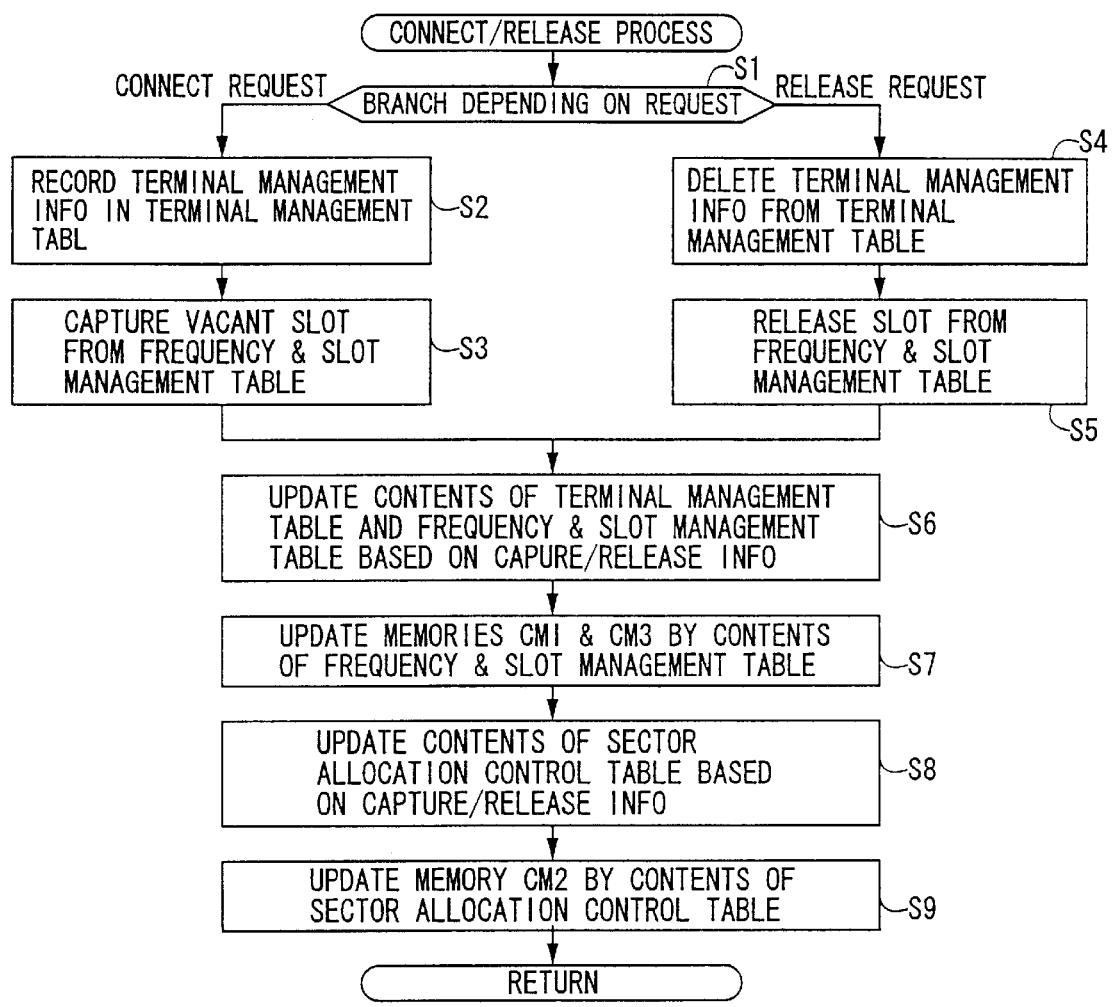
FIG. 8 is a flow chart for explaining a speech channel connect/release process of the first embodiment.

FIG. 8 is a flow chart for explaining a speech channel connect/release process of this first embodiment. The process shown in FIG. 8 is carried out by the channel connection controller 20. When a channel connect/release (or disconnect) request based on calling, call reception, handover (moving in the cell during call) and the like is generated with respect to a terminal existing within the cell, the necessary call process is carried out, and thereafter, the process shown in FIG. 8 is started at the stage where the speech channel is connected or disconnected.

In FIG. 8, a step S1 branches to a step S2 or a step S4 depending on the kind of request. In the case of the channel connect request, the process branches to the step S2 which records terminal management information related to the channel connect request in a terminal management table 21.

FIG. 9 shows the stored contents of the terminal management table 21. The stored contents shown in FIG. 9 correspond to a communication state shown in FIG. 12 which will be described later. In FIG. 9, a column identified by "item number" indicates a value which may range from 1 to 9 to indicate that a maximum of 9 terminals may be accommodated within 1 cell (in any sector). A column identified by "terminal" indicates a telephone number or the like of the terminal, and in this particular case, the telephone numbers of the 7 terminals A through G being accommodated are recorded. A column identified by "sector" records a sector number of the sector in which the terminal exists, and for example, 4 terminals D through G are being accommodated within the sector 3 in this case. A column identified by "frequency" records the frequencies f1 through f3 allocated for each of the terminals, and for example, the frequency f1 is allocated to the terminal G existing in the sector 3 in this case. A column identified by "slot" records the time slots S1 through S3 allocated for each of the terminals, and for example, in the sector 3 the terminals F and G share 1 time slot S3 at the respective frequencies f3 and f1 in this case.

In the following description, it is assumed for the sake of convenience that at the stage of the process where the step S2 is carried out, the channel connect request with respect to the terminal G is not yet accepted. Returning now to the description of FIG. 8, a step S3 captures vacant time slots from the transmission frequency and slot management table 22 shown in FIG. 10A and the reception frequency and slot management table 23 shown in FIG. 10B. At this point in time, the vacant time slots include the time slots (T2, R2) and (T3, R3) of the frequency (f1, f1'), and the time slot (T3, R3) of the frequency (f2, f2'), but in this particular case, the time slot (T3, R3) of the frequency (f1, f1') is captured.

A step S6 updates the contents of the terminal management table 21 shown in FIG. 9, the transmission frequency and slot management table 22 shown in FIG. 10A and the reception frequency and slot management table 23 shown in FIG. 10B, based on the time slot capture information described above. A step S7 updates the contents of the control memories CM1 and CM3 by the contents of the corresponding transmission frequency and slot management table 22 and the reception frequency and slot management table 23.

A step S8 updates the contents of a sector allocation control table 24 shown in FIG. 11 based on the time slot capture information. In this particular case, a switch control signal S13=1 is newly recorded in FIG. 11 so as to allocate the transmission frequency signal f1 addressed to the terminal G to the sector 3 at the timing of the time slot T3.

A step S9 updates the contents of the control memory CM2 by the contents of the sector allocation control table 24.

On the other hand, in the case of the channel disconnect (release) request, the process branches to the step S4 which deletes the terminal management information related to the channel disconnect request from the terminal management table 21. A step S5 releases the corresponding time slots in the transmission frequency and slot management table 22 and the reception frequency and slot management table 23. Thereafter, the steps S6 through S9 described above are carried out, but this time, based on the time slot release information.

Figure 12:
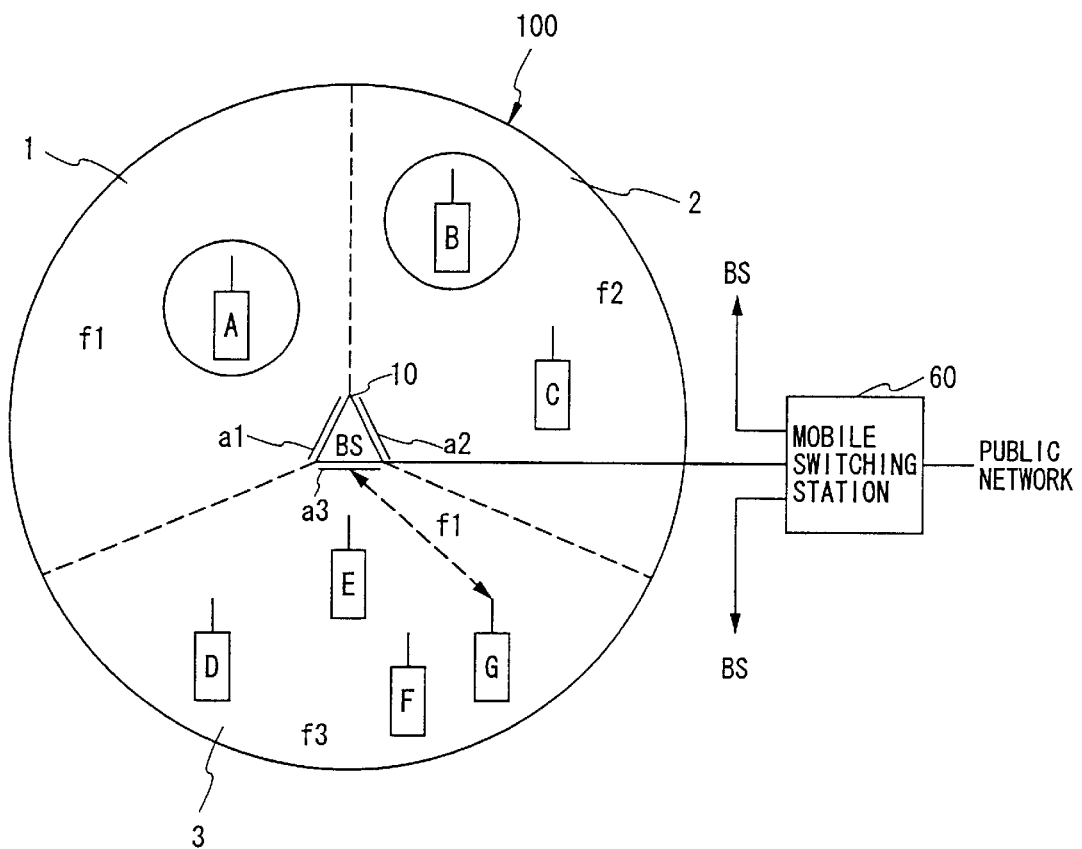
FIG. 12 is a diagram for explaining a communication state of the first embodiment of the base station apparatus.
Figure 13:
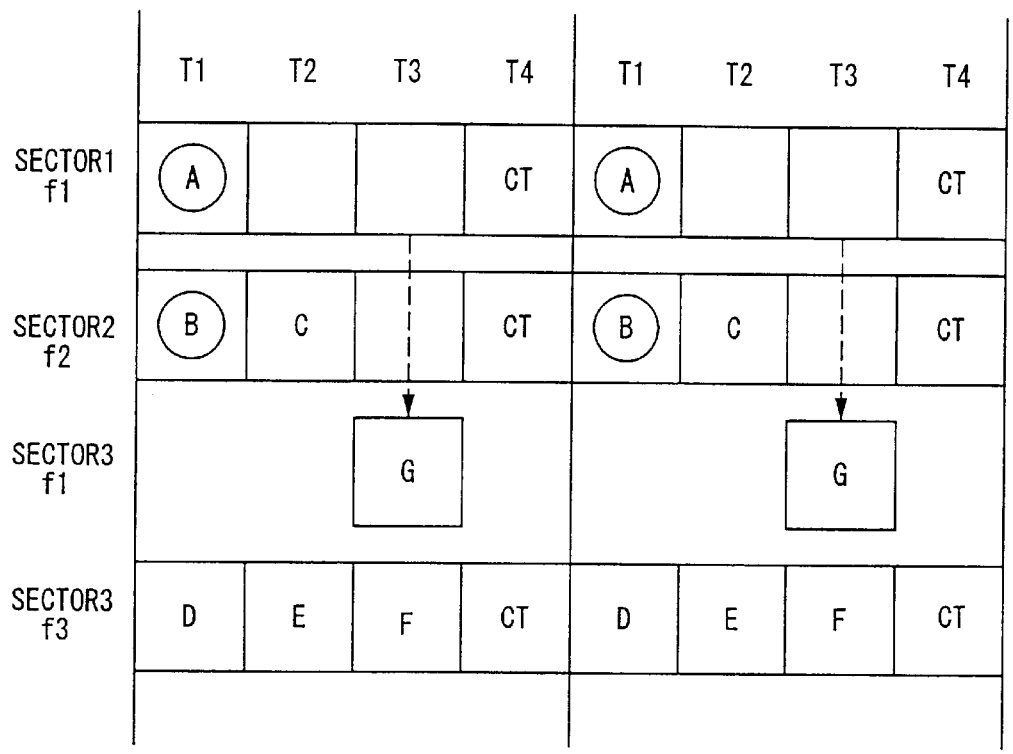
FIG. 13 is a timing chart for explaining a down-communication from the first embodiment of the base station apparatus to each of the terminals.

FIG. 12 is a diagram for explaining the communication state of this first embodiment of the base station apparatus, and FIG. 13 is a timing chart for explaining a down-communication from this first embodiment of the base station apparatus to each of the terminals. FIGS. 12 and 13 respectively correspond to the communication state of the conventional system shown in FIGS. 1 and 2.

In this first embodiment, the fourth terminal G in the sector 3 utilizes the vacant time slot (T3, R3) of the frequency (f1, f1') in the sector 1, so as to be accommodated simultaneously as the timing of the time slot (T3, R3) in the sector 3. In this case, the frequencies f3 and f1 used by the terminals F and G in the sector 3 differ, and no interference is generated for this reason. On the other hand, the vacant time slot (T3, R3) of the frequency (f1, f1') in the sector 1 is effectively utilized in the sector 3 in which the subscribers are concentrated. Accordingly, this first embodiment of the base station apparatus 10 can flexibly accommodate a maximum of 9 terminals for each of the sectors 1 through 3, thereby making it possible to effectively utilize the communication resources (frequencies and the like).

Figure 14:
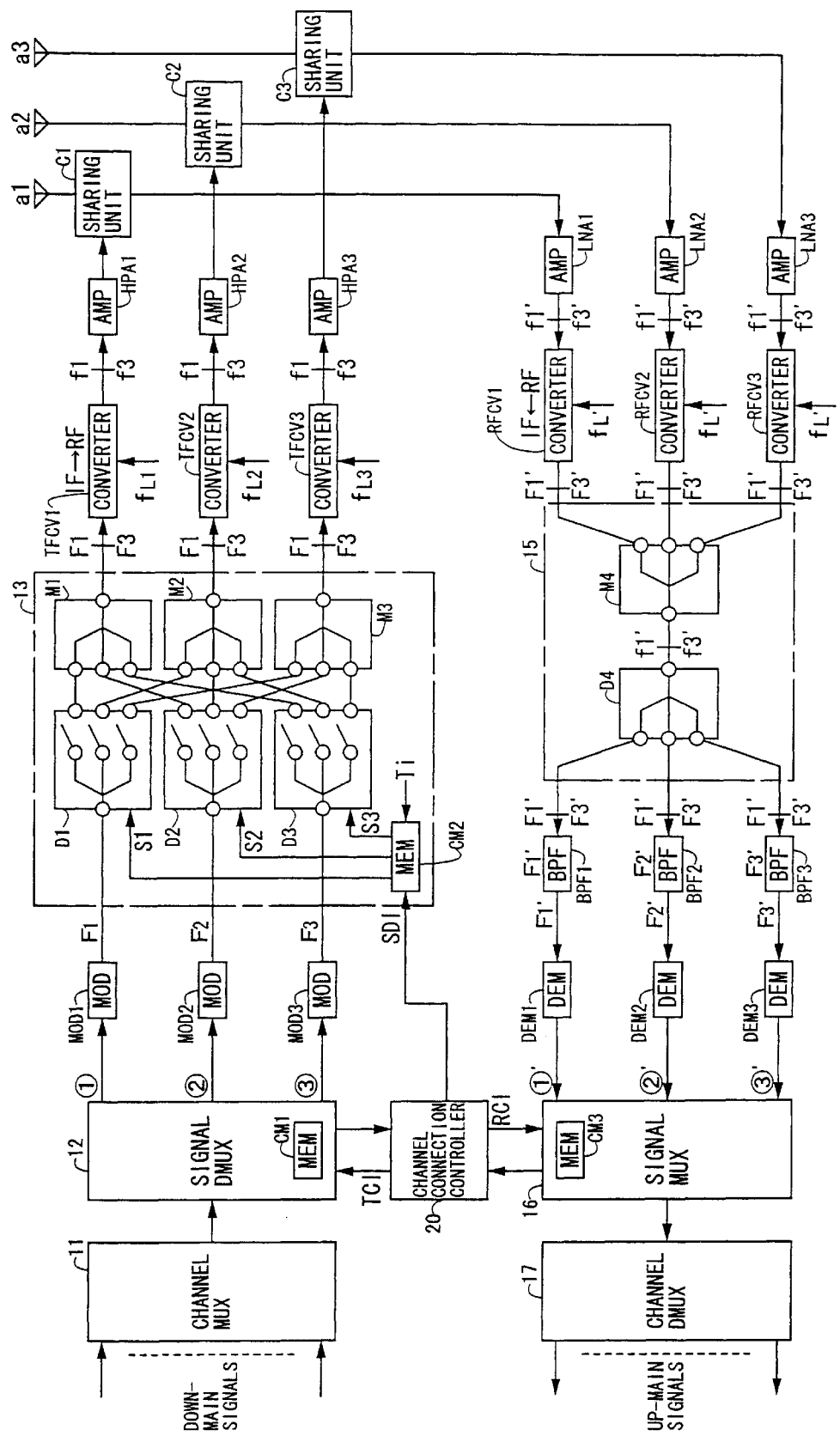
FIG. 14 is a system block diagram showing the construction of a modification of the first embodiment of the base station apparatus.

FIG. 14 is a system block diagram showing the construction of a modification of the first embodiment of the base station apparatus. FIG. 14 shows a case where the transmission frequency converters TFCV1 through TFCV3 are provided at a state subsequent to the sector distributor and multiplexer unit 13, and the reception frequency converters RFCV1 through RFCV3 are provided at a stage preceding the sector multiplexing and distributor unit 15.

In FIG. 14, the modulators MOD1 through MOD3 respectively modulate carrier signals having the intermediate frequencies F1 through F3 by the channel data of the transmission frequency-based channels ①  through ③, so as to generate the intermediate frequency signals F1 through F3, where F1<F2<F3, for example. The intermediate frequency signals F1 through F3 are switched, distributed and multiplexed by the sector 20 distributor and multiplexer unit 13, and each of the intermediate frequency signals F1 through F3 are output to the sector-based channels ④ through ⑥. The frequency converters TFCV1 through TFCV3 convert the input intermediate frequency signals F1 through F3 into the output radio frequency signals f1 through f3 by the constant (common) local frequency signal $f_L$, where the following relationships stand.

$$f1<f2<f3$$

$$f_L=f1-F1=f2-F2=f3-F3$$

On the other hand, each of the output signals f1' through f3' of the low-noise amplifiers LNA1 through LNA3 are input to the frequency converters RFCV1 through RFCV3, and are converted into the intermediate frequency signals F1' through f3' by the constant (common) local signal $f_L'$, where the following relationships stand.

$$F1'<F2'<F3'$$

$$f_L'=f1'-F1'=f2'-F2'=f3'-F3'$$

Each of the intermediate frequency signals F1' through F3' are power-multiplexed and distributed by the sector multiplexer and distributor unit 15, and output to the reception frequency-based channels ①' through ③'. In addition, the bandpass filter BPF1 having the center frequency f1' extracts the intermediate frequency signal F1' corresponding to the received frequency signal f1', the bandpass filter BPF2 having the center frequency F2' extracts the intermediate frequency F2' corresponding to the received frequency signal f2', and the bandpass filter BPF3 having the center frequency F3' extracts the intermediate frequency signal F2' corresponding to the received frequency signal f3'. Hence, each of the received frequency signals f1' through f3' having the reception frequencies which are permitted to coexist for each of the sectors 1 through 3, are separated into the intermediate frequency signals F1' through F3' of the reception frequency-based channels ①' through ③', and extracted in correspondence with the time slots. Otherwise, the construction of this modification shown in FIG. 14 is basically the same as that of the first embodiment shown in FIG. 4.

According to this modification of the first embodiment of the base station apparatus, both the sector distributor and multiplexer unit 13 and the sector multiplexer and distributor unit 15 can be used in the intermediate frequency range. For this reason, the sector distributor and multiplexer unit 13 and the sector multiplexer and distributor unit 15 can be formed by a compact lumped constant circuit, instead of using the microwave circuit. Of course, it is possible to use only one of the sector distributor and multiplexer unit 13 and the sector multiplexer and distributor unit 15 in the intermediate frequency range.

Figure 15:
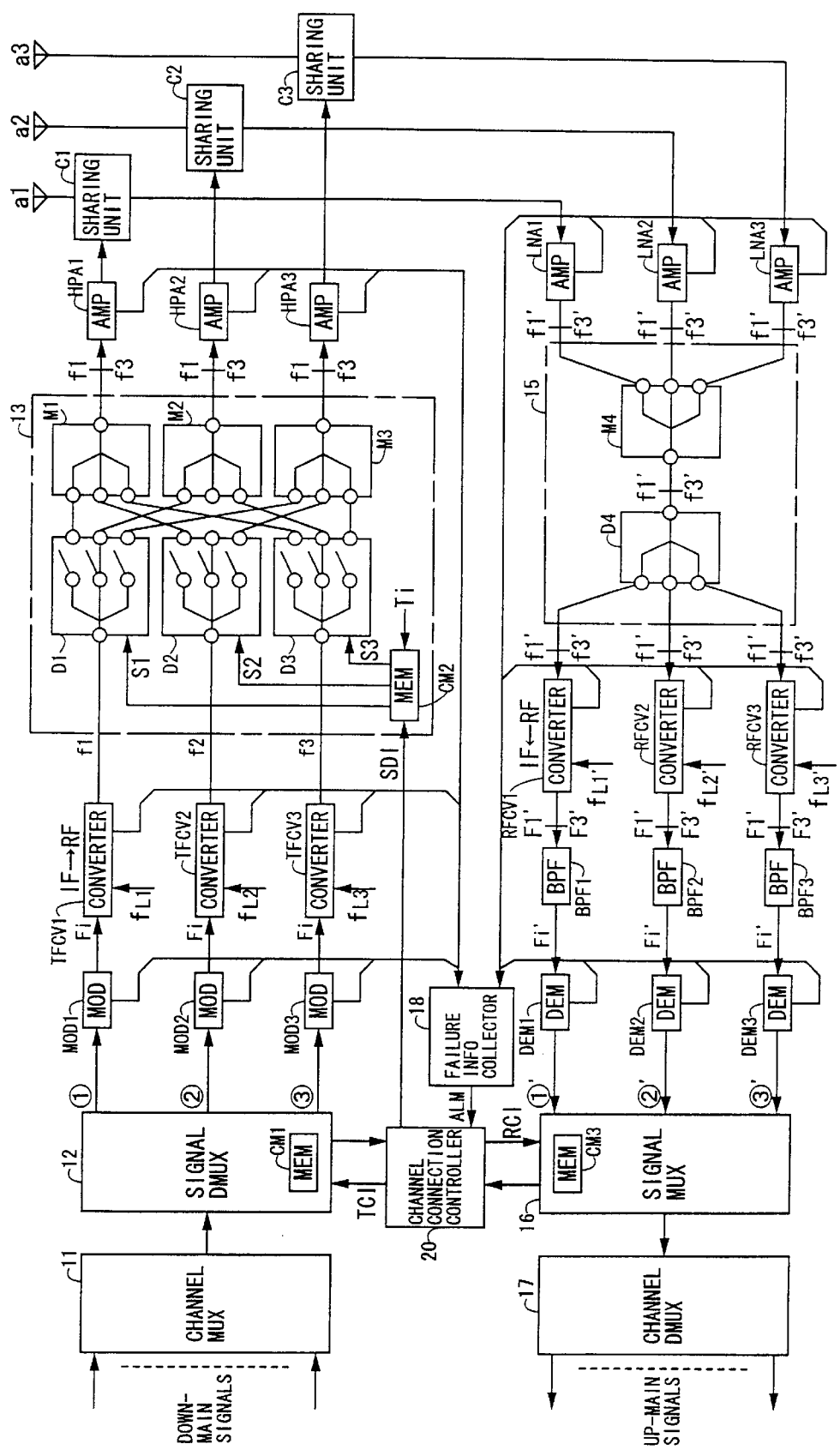
FIG. 15 is a system block diagram showing the construction of a second embodiment of the base station apparatus according to the present invention.

FIG. 15 is a system block diagram showing the construction of a second embodiment of the base station apparatus according to the present invention. FIG. 15 shows the construction which can flexibly cope with the failure of each of the equipments within the base station apparatus, without employing an expensive redundant configuration.

In FIG. 15, a failure information collector 18 collects various failure information from the equipments within the base station apparatus, and notifies the collected failure information to the channel connection controller 20. Otherwise, the construction of this second embodiment may be the same as that of the first embodiment shown in FIG. 4 or the modification of the first embodiment shown in FIG. 14. In addition, the speech channel connect/disconnect process may be carried out according to the flow chart shown in FIG. 8 described above. However, in this second embodiment, each equipment within the base station apparatus has a function of detecting its own failure.

FIG. 16 is a diagram for explaining a terminal management table 21 of this second embodiment. FIGS. 17A and 17B respectively are diagrams for explaining a transmission frequency and slot management table 22 and a reception frequency and slot management table 23 of this second embodiment. FIG. 18 is a diagram showing a sector allocation control table 24 of this second embodiment.

Further, FIGS. 19A and 19B respectively are diagrams for explaining a transmission failed equipment management table 25 and a reception failed equipment management table 26 of this second embodiment. The transmission failed equipment management table 25 manages information indicating the existence or non-existence of failure in each of the modulators MOD1 through MOD3, the frequency converters TFCV1 through TFCV3, and the high-output power amplifiers HPA1 through HPA3, basically in correspondence with the transmission frequency-based channels ① through ③ (frequencies f1 through f3). The reception failed equipment management table 26 manages information indicating the existence or non-existence of failure in each of the demodulators DEM1 through DEM3, the frequency converters RFCV1 through RFCV3, and the low-noise amplifiers LNA1 through LNA3, basically in correspondence with the reception frequency-based channels ①' through ③' (frequencies f1' through f3'). In the following description, it is assumed for the sake of convenience that the transmission frequency converter TFCV1 failed.

FIGS. 17A and 17B respectively show the stored contents of the transmission frequency and slot management table 22 and the reception frequency and slot management table 23. The channel connection controller 20 manages the transmission failed equipment management table 25 and the reception failed equipment management table 26, and updates the stored contents of the transmission frequency and slot management table 22 and the reception frequency and slot management table 23 due to the failure of the transmission frequency converter TFCV1, for example. More particularly, as may be seen from FIG. 15, when the transmission frequency converter TFCV1 fails, the system of the transmission frequency-based channel ① (frequency f1) in the transmission frequency and slot management table 22 can no longer be used. Hence, a non-usable mark X is recorded in the time slots T1 through T3 of the frequency f1 in the transmission frequency and slot management table 22.

On the other hand, in the reception frequency and slot management table 23, although no equipment failure exists, it is normally desirable that the reception frequency f1' corresponding to the above transmission frequency f1 which is not used is also not used or, that the use of the corresponding reception frequency f1' is not permitted. Hence, a non-usable mark X is recorded in the time slots R1 through R3 of the reception frequency-based channel ①' (frequency f1') in the reception frequency and slot management table 23. The channel connection controller 20 refers to the stored contents of the transmission frequency and slot management table 22 and the reception frequency and slot management table 23 which are managed by the channel connection controller 20, so that an appropriate vacant time slot can easily be captured by also taking into consideration the time slots which are non-usable, when the channel connect request is received.

In this particular case, because the time slots T1 through T3 of the transmission frequency f1 cannot be used due to the equipment failure, the terminal A which employs the pre-assign system communicates in the time slot T3 of the transmission frequency f2, and for this reason, the terminal G which employs the demand-assign system cannot communicate since there is no vacant time slot. Accordingly, the connect request management information of the terminal G is deleted under the column of the item number 7 in the terminal management table 21 shown in FIG. 16.

FIG. 18 shows the stored contents of the sector allocation control table 24 for this particular case. Since the system of the transmission frequency f1 is not used as described above, the switching signals S11 through S13 are all "0" throughout the time slots T1 through T4. On the other hand, the terminal A which employs the pre-assign system and exists in the sector 1 is assigned the time slot T3 of the transmission frequency f2, and as a result, the switching signal S21 is "1" at the timings of the time slots T3 and T4. Hence, the terminal A which employs the pre-assign system and exists in the sector 1 in a semi-fixed manner within a building or the like, can exchange the speech signal A and the control signal CT if necessary with the base station apparatus 10 using the frequency (f2, f2') instead even if the frequency (f1, f1') cannot be used. In this case, the channel connection controller 20 may connect the terminal A which employs the pre-assign system with priority over other terminals. An operation similar to that described above is carried out if other equipments within the base station apparatus 10 fails. Various roundabout routes may be considered depending on the location of the failure within the base station apparatus 10.

Therefore, according to this second embodiment, the terminals within the sectors 1 through 3 can be accommodated by the base station apparatus 10 with flexibility, even if the equipment within the base station apparatus 10 fails. Moreover, since it is unnecessary to provide an expensive redundant configuration as a measure against the equipment failure, it is possible to maintain the high reliability of the communication service using facilities which are basically the same as the existing facilities.

Figure 20:
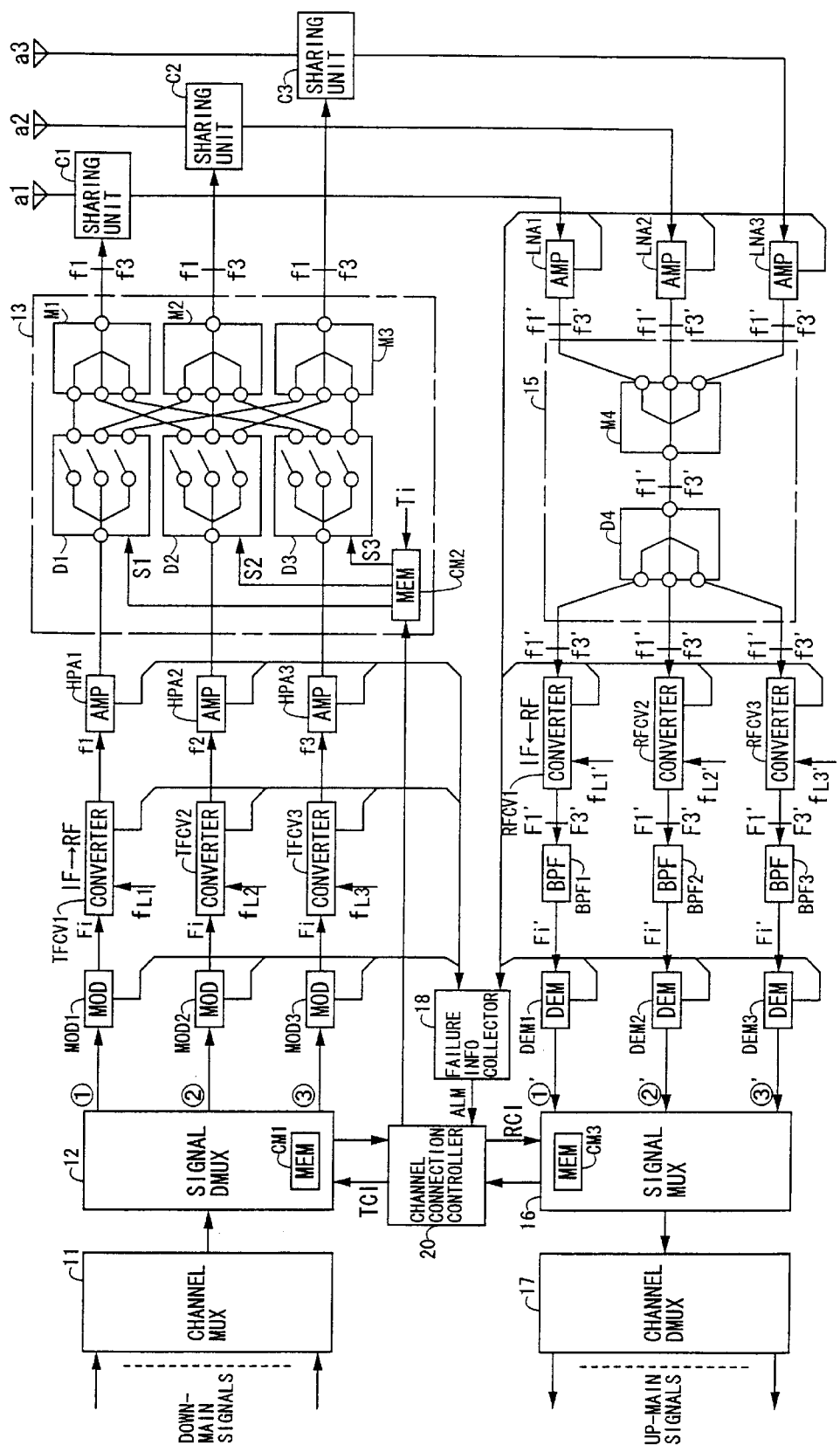
FIG. 20 is a system block diagram showing the construction of a modification of the second embodiment of the base station apparatus.

FIG. 20 is a system block diagram showing a modification of the second embodiment of the base station apparatus. FIG. 20 shows a case where the high-output power amplifiers HPA1 through HPA3 are provided at the stage preceding the sector distributor and multiplexer unit 13. According to the construction shown in FIG. 15, the terminal within the corresponding sector cannot be accommodated by the base station apparatus if one of the high-output power amplifiers HPA1 through HPA3 fails. But according to the construction shown in FIG. 20, the sector distributor and multiplexer unit 13 is provided between the high-output power amplifiers HPA1 through HPA3 and the antennas a1 through 13, so as to effectively avoid the undesirable situation which may occur in the second embodiment. For this reason, the reliability of the communication service is further improved according to this modification of the second embodiment.

Figure 21:
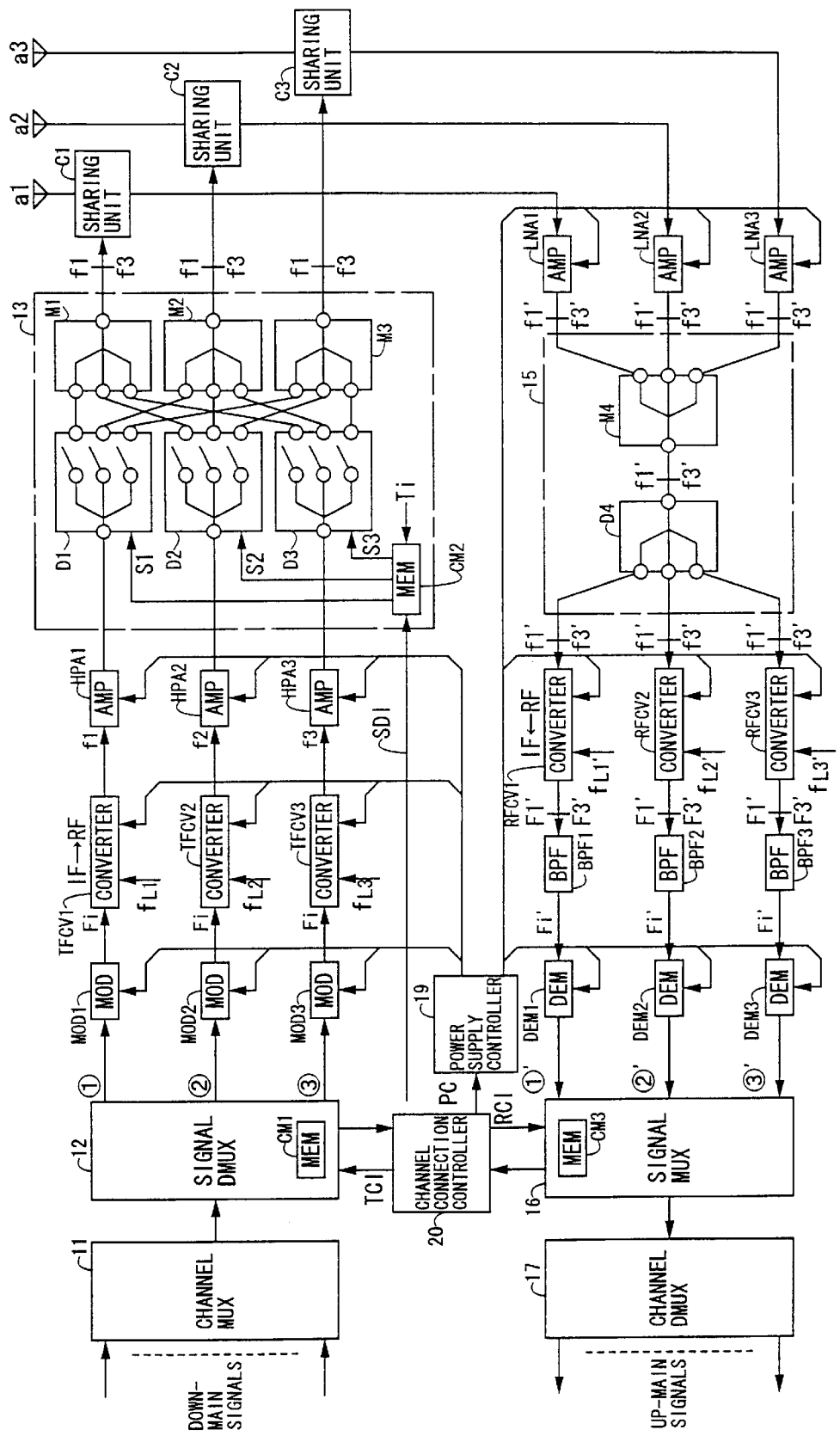
FIG. 21 is a system block diagram showing a third embodiment of the base station apparatus according to the present invention.

FIG. 21 is a system block diagram showing a third embodiment of the base station apparatus according to the present invention. FIG. 21 shows a case where the power supply to a non-used equipment within the base station apparatus is temporarily stopped, so as to reduce the power consumption. In this case, the time slots are allocated with respect to each of the terminals in the sectors 1 through 3 until the time slots are fully utilized, in a sequence starting from one frequency (for example, f1, f1'). Hence, the remaining frequency-based channels are regarded as vacant, and the power supply to the corresponding part is stopped so as to greatly reduce the power consumption.

In FIG. 21, a power supply controller 19 controls the ON/OFF state of the power supply to each of the equipments within the base station apparatus, based on a power supply control signal PC from the channel connection controller 20. Otherwise, the construction of this third embodiment shown in FIG. 21 is basically the same as that of the first embodiment shown in FIG. 4 or the modification of the first embodiment shown in FIG. 14.

Figure 22:
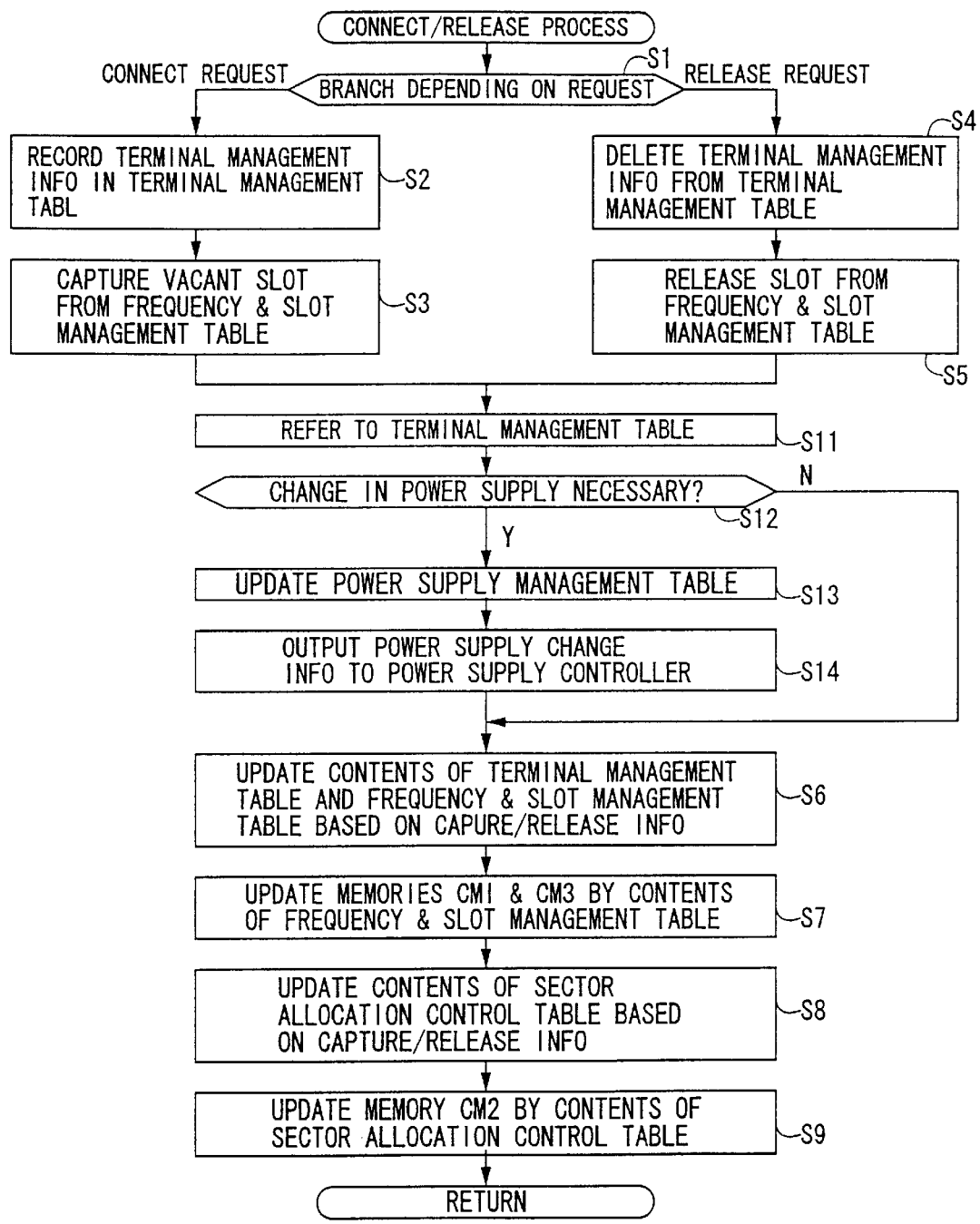
FIG. 22 is a flow chart for explaining a speech channel connect/release process of the third embodiment.

FIG. 22 is a flow chart for explaining a speech channel connect/release process of this third embodiment. In FIG. 22, those steps which are the same as those corresponding steps shown in FIG. 8 are designated by the same reference numerals, and a description thereof will be omitted.

In FIG. 22, steps S11 through S14 are provide in addition to the steps shown in FIG. 8. The step S11 refers to the contents of the terminal management table 21 (or the transmission frequency and slot management table 22 and the reception frequency and slot management table 23), responsive to a change (capture/release of the time slot) in the terminal management table 21 in the preceding step.

FIG. 23 is a diagram for explaining the terminal management table 21 of this third embodiment, and FIGS. 24A and 24B respectively are diagrams for explaining the transmission frequency and slot management table 22 and the reception frequency and slot management table 23 of this third embodiment.

FIG. 23 shows the stored contents of the terminal management table 21. In FIG. 23, it is assumed that the terminal C existing in the sector 2 is newly accommodated by the base station apparatus in addition to the terminals A and B which were already accommodated. Since a maximum of 3 time slots can be used for the frequency (f1, f1'), the time slot S3 of the frequency (f1, f1') is allocated for the terminal C.

FIG. 24A shows the stored contents of the transmission frequency and slot management table 22 for this case, and FIG. 24B shows the stored contents of the reception frequency and slot management table 23 for this case. As shown in FIGS. 24A and 24B, the terminals A through C are accommodated in the time slots (T1, R1) through (T3, R3) of the frequency (f1, f1').

Returning now to the description of FIG. 22, the step S12 decides whether or not a change of the power supply state is necessary. FIG. 25 is a diagram for explaining a sector allocation control table 24 of this third embodiment, and FIGS. 26A and 26B respectively are diagrams for explaining a transmission power supply management table 27 and a reception power supply management table 28 of this third embodiment. More particularly, FIGS. 25, 26A and 26B respectively show the stored contents of the sector allocation control table 24, the transmission power supply management table 27 and the reception power supply management table 28.

Because all of the terminals A through C in the sectors 1 and 2 can be accommodated by the base station apparatus solely by the system of the frequency (f1, f1') in this particular case, it is sufficient to supply the power to modulator MOD1, the transmission frequency converter TFCV1 and the high-output power amplifier HPA1 at the transmission side, as shown in FIG. 21. The sector distributor and multiplexer unit 13 constantly operates. In addition, since only the frequency f1' is used for the sectors 1 and 2 at the reception side, it is sufficient to supply the power to the low-noise amplifiers LNA1 and LNA2, the reception frequency converter RFCV1 and the demodulator DEM1. The sector multiplexer and distributor unit 15 and the bandpass filters BPF1 through BPF3 are made up of circuits which use passive elements. Further, the power supply state does not need to be changed between before and after accommodating the terminal C.

Returning now to the description of FIG. 22, the decision result in the step S12 is NO and the process advances to the step S6, because there is no need to change the power supply state in this case. But if the decision result in the step S12 is YES, the step S13 obtains the equipment which newly needs to receive the power supply, and the stored contents of the transmission power supply management table 27 and the reception power supply management table 28 are updated accordingly. In addition, the step S14 outputs the power supply control signal PC which indicates the change of the power supply state to the power supply controller 19. The power supply controller 19 controls the ON/OFF state of the power supply with respect to the corresponding equipment within the base station apparatus, in response to the power supply control signal PC.

FIG. 25 shoes the stored contents of the sector allocation control table 24 corresponding to the transmission frequency and slot management table 22 shown in FIG. 24A. In FIG. 25, the switching signal S11 is "1" at the timings of the speech slot T1 which connects to the terminal A in the sector 1 and the control slot T4. Further, the switching signal S12 is "1" at the timings of the speech slots T2 and T3 which connect to the terminals B and C in the sector 2 and the control slot T4. Hence, it is possible to exchange the control signal between the base station apparatus 10 and the terminals B and C in the sector 2 via the control slots (T4, R4) of the frequency (f1, f1'). The other switching signals S13 through S13 are all "0" because they are not used.

Of course, it is possible to arbitrarily combine two or more embodiments and modifications described above. For example, it is possible to combine the second and third embodiments described above.

In addition, although numerical examples are used for the number of sectors, number of frequency-based channels and the like in the embodiments described above, the present invention is not limited to such numerical examples.

In each of the embodiments described above, it is assumed that the pre-assign system and the demand-assign system coexist for the communication services. However, the present invention can of course be applied to the communication services which employ only the pre-assign system or only the demand-assign system.

Moreover, although the present invention is applied to the speech system in the described embodiments, the present invention can of course be applied to various data communication systems which communicate using computer data, image data and the like.

Further, the present invention is not limited to these embodiments, but various variations and modifications may be made without departing from the scope of the present invention.

What is claimed is:

1. A base station apparatus for a radio communication system which divides one cell into a plurality of sectors and communicates with a plurality of terminal stations according to TDMA via antennas which are provided for each of the sectors, said base station apparatus comprising:

a frequency-based distributor and modulator unit which distributes each of channel data to be transmitted in correspondence with each of time slots of a plurality of transmission frequency-based channels, and modulates the distributed channel data to modulated signals;

a sector-based distributor and multiplexer unit which distributes the modulated signals to sector-based channels which are prescribed in advance in correspondence with the time slots, and multiplexes the distributed modulated signals for each of the sector-based channels; and a channel connection controller which generates distribution control information of each of the transmission frequency-based channels and the sector-based channels depending on a channel connect or disconnect request.

2. The base station apparatus as claimed in claim 1, which further comprises:

a sector multiplexer and distributor unit which multiplexes each of received signals of the sector-based channels, and distributes the multiplexed received signals to a plurality of reception frequency-based channels; and a frequency-based demodulator unit which extracts frequency signals corresponding to the reception frequency-based channels from each of the distributed signals from said sector multiplexer and distributor unit, and demodulates the frequency signals in correspondence with the time slots.

3. The base station apparatus as claimed in claim 1, wherein said channel connection controller generates the distribution control information in response to a new channel connect request so as to connect a vacant slot of the transmission frequency-based channels to a sector in which a terminal making the new channel connect request exists.

4. The base station apparatus as claimed in claim 1, which further comprises:

a failure information collector which collects failure information of equipments within said base station apparatus, said channel connection controller using a time slot which is unaffected by a failed equipment, of time slots of the transmission frequency-based channels, based on the failure information collected by said failure information collector.

5. The base station apparatus as claimed in claim 1, which further comprises:

a power supply controller which controls ON/OFF state of a power supply to equipments within the base station apparatus based on an instruction from said channel connection controller, said channel connection controller outputting an instruction which turns OFF the power supply to a non-used equipment in the transmission frequency-based channel.

6. The base station apparatus as claimed in claim 2, which further comprises:

a power supply controller which controls ON/OFF state of a power supply to equipments within the base station apparatus based on an instruction from said channel connection controller, said channel connection controller outputting an instruction which turns OFF the power supply to a non-used equipment in the reception frequency-based channel.

7. The base station apparatus as claimed in claim 1, wherein said channel connection controller uses the time slots in a sequence starting from the time slots of one of the transmission frequency-based channels, so that the time slots are fully utilized.

* * * * *